United States Patent [19]
McCullough et al.

[11] Patent Number: 5,272,946
[45] Date of Patent: Dec. 28, 1993

[54] SAFETY CONTROL SYSTEM FOR POWER OPERATED EQUIPMENT

[75] Inventors: Timothy J. McCullough, Vermilion; David A. Masters, Monroeville, both of Ohio

[73] Assignee: Food Industry Equipment International, Inc., Lorain, Ohio

[21] Appl. No.: 855,768
[22] Filed: Mar. 20, 1992
[51] Int. Cl.$^5$ .............. A22B 5/16; B27G 19/00; F16P 3/12
[52] U.S. Cl. .................. 83/58; 83/788; 83/819; 83/DIG. 1; 192/131 R; 192/129 A; 452/125; 452/127
[58] Field of Search ............ 83/DIG. 1, 58, 478, 83/788, 814, 816, 818, 819; 192/129 A, 130, 131 R, 93 C, 71; 452/125, 127

[56] References Cited

U.S. PATENT DOCUMENTS

| | | | |
|---|---|---|---|
| 721,270 | 2/1903 | Zeckendorf. | |
| 941,726 | 11/1909 | Pfalzgraf. | |
| 2,626,692 | 1/1953 | Sloan | 192/93 C |
| 2,978,084 | 4/1961 | Vilkaitis | 192/131 |
| 3,011,610 | 12/1961 | Stiebel et al. | 192/131 |
| 3,047,116 | 7/1962 | Stiebel et al. | 192/131 |
| 3,370,233 | 2/1968 | Morelock | 324/158 |
| 3,785,230 | 1/1974 | Lokey | 83/58 |
| 3,949,661 | 4/1976 | Greider | 83/DIG. 1 X |
| 4,026,177 | 5/1977 | Lokey | 83/835 |
| 4,117,752 | 10/1978 | Yoneda | 83/58 |
| 4,195,722 | 4/1980 | Anderson et al. | 192/131 |
| 4,321,841 | 3/1982 | Felix | 74/615 |
| 4,391,358 | 7/1983 | Haeger | 192/130 |
| 4,621,300 | 11/1986 | Summerer | 361/175 |
| 4,965,909 | 10/1990 | McCullough et al. | 192/131 R X |
| 5,122,091 | 6/1992 | Townsend | 452/127 |
| 5,123,507 | 6/1992 | Carlson et al. | 192/71 X |

FOREIGN PATENT DOCUMENTS 0445860 9/1991 European Pat. Off. ............ 192/130
3501021 7/1985 Fed. Rep. of Germany.

Primary Examiner—Eugenia Jones
Attorney, Agent, or Firm—Michael Sand Co.

[57] ABSTRACT

A safety control system for power operated equipment which ensures operator safety by immediately disconnecting the power drive from a power driven rotating member, such as a toothed feed shaft of a meat skinning machine or a moving blade of a band saw, and then positively stops and then reverses the direction of movement of the rotating member, upon a metal conductive glove worn by the operator, contacting the blade or toothed shaft. The operator's glove is electrically connected to a safety mechanism and upon the glove completing a circuit upon contact with the rotating member or equipment immediately disconnects the power drive from the rotating member by actuating a clutch or tensioning cylinder. A trigger mechanism then is actuated and permits a positive stopping element to engage and stop the moving element. A power actuated plunger then is actuated and moves the stopping element in an opposite direction to reverse the direction of the rotating member in an incremental step to further reduce the possibility of injury to the operator. A moisture impervious dielectric plastic glove preferably is worn by the operator to prevent the moisture in the meat from conducting current between the metal glove and machine until the plastic glove is cut and contact made with the metal glove. A switch requires manual actuation to connect the power drive to the rotatable member. The metal gloves are connected to the safety switch by electrodes secured to the metal gloves.

22 Claims, 14 Drawing Sheets

SAFETY CONTROL SYSTEM FOR POWER OPERATED EQUIPMENT

BACKGROUND OF THE INVENTION

1. Technical Field

The invention relates to a control system incorporated into machinery such as power operated meat skinning equipment, a power driven band saw or the like, to detect the touch of a bare or gloved human hand upon a conductive surface such as a rotating blade or a rotating feed mechanism, in order to provide automated means for protective action against harm to an operator by immediately disconnecting the power drive means from the rotating element, stopping the rotating element and then reversing the direction of rotation of the rotating element.

2. Background Information

Various types of tools have been devised for performing various operations such as power actuated drills, grinders, meat cutting and trimming tools, etc. which are operated by power drive means, such as a chain or belt drive, from the output shaft of an electric motor.

One type of such a machine which is used in the meat industry is referred to as a meat skinning machine. These machines may be floor mounted units having a horizontally extending rotatable shaft on which is mounted a plurality of teeth located adjacent a skinning knife blade. An operator holds a piece of meat, such as a ham, and presses the meat against the rotating teeth which in combination with the blade, removes the skin from the meat. Another type of equipment used in the meat industry and in other types of industry is a power driven band saw.

As with any power operated equipment there is always the danger that the hands or fingers of an operator will come into contact with the rotating blade of the band saw, or the rotating toothed feed shaft and adjacent cutting blade of a skinning machine Therefore to ensure safety to the operator when operating such equipment, he or she will usually wear protective metal mesh gloves of the type shown in U.S. Pat. Nos. 4,384,449, 4,470,251 and 4,004,295. These gloves usually consist of a fine metal mesh covered with strands of a synthetic fiber. The metal mesh prevents or reduces the cutting of the operator upon contacting a cutting blade. Although these metal mesh gloves provide good protection to the operator and have been found to be quite satisfactory for reducing injury to the operator, as a result of non mechanical injuries. They are not suitable for many types of mechanical cutting operations. As a result, it is still desirable to provide even greater protection to the operator in certain applications by providing a system which instantaneously removes the power drive source from the rotating element upon contact of the operator's gloved hand with the element or certain other areas of the particular equipment being used by the operator.

Examples of other protective devices and systems for use in reducing injury to the operator as shown in U.S. Pat. No. 941,726, 3,785,230, 4,026,177, 4,391,358, and 4,621,300. Still other types of protective devices provide a mechanism attached to the hands of the operator which automatically pull the operator's hand away from the dangerous part of the equipment upon a certain event occurring. Examples of such safety equipment are shown in U.S. Pat. Nos. 2,978,084; 3,011,610; 3,047,116; 4,195,722; and 4,321,841.

Still another type of safety control system is shown in German Patent application Serial No. DE 35 01 021. Although the safety control system of this German device may be satisfactory for certain applications, even after contact of the two electrically isolated components and immediate deenergizing of the electric, there will be some continued movement of the rotating cutting blade or feed roller due to inertia which may continue to draw the operator's gloved hand into the machine possibly causing significant injury. Another problem with this German device is that the machine can be energized and operated without the operator wearing the gloves since energization of the machine does not require the electrical control circuit to first sense the presence of the operator wearing the metal gloves.

Many of the disadvantages in existing safety control systems intended for use with equipment as of the general type of the present invention, are believed overcome by the control system of U.S. Pat. No. 4,965,909. In this system a reversible electric motor is utilized which automatically reverses upon contact between one of the operator's metal gloves and the rotating metal component, to prevent the operator's hand from being drawn into the cutting element by the inertia of the rotating element. Although the use of such a reversible electric motor provides increased safety to the system, it requires a relatively expensive motor and reversing mechanism. Also it is desirable to reduce the system reaction time even further, since significant time is required for the electrical and mechanical components necessary for motor reversal to change their status, thus applying reverse current to the motor and overcoming the back emf for motor reversal, even though these times are measured in milliseconds.

Therefore, the need exists for an improved safety control system which immediately disconnects the power drive source from a rotating metal component of a meat processing machine or other power driven equipment, and which stops and then causes reversal of the rotating component to prevent injury to the operator upon an electric conductive metal protective glove worn by the operator or operator's bare skin contacting a particular metal component.

SUMMARY OF THE INVENTION

Objectives of the invention include providing an improved safety control system for power operated equipment and in particular for meat trimming band saws, skinning machines and similar equipment, which preferably is driven by an electric drive source, and which has a rotating cutting blade or meat feed shaft, which when contacted by an electrical conductive glove worn by the operator, or when contacted by the bare skin of the operator, immediately disconnects the power drive source from the rotating component, stops and then reverses the direction of movement of the component to prevent injury to the operator.

A further objective of the invention is to provide such an improved control system in which a clutch is mounted between the rotating metal component and the power drive means for operatively connecting the metal component to and from the drive means, afterwhich the direction of movement of the metal component is reversed which eliminates the need for stopping the rotating mass of the drive means before reversing the rotating component, thereby providing a faster response time to increase operator safety.

A still further objective of the invention is to provide such an improved control system in which the electric conductive gloves worn by the operator are electrically connected by wrist mounted electrodes and are connected to a safety switch portion of the control system by conductors to ensure good electrical contact between the mesh gloves and control system for disconnecting the power drive means from the rotating metal component upon contact of the rotating component by the gloved hand of the operator.

Another objective of the invention is to provide such an improved control system in which a manually operated switch is connected with the control system and must be actuated by the operator to start the power drive means; and in which the wrist electrodes must be in position on the operator's wrist before the power drive means can be actuated by the manually operated switch.

A still further objective of the invention is to provide such an improved control system in which the operator preferably wears moisture impervious dielectric gloves, such as inexpensive disposable plastic gloves, over the electric conductive gloves so that the moisture in a piece of meat being manipulated by the operator will not permit conductance of electric current between the metal mesh gloves and the isolated electric component of the meat processing equipment thereby prematurely deactuating the power drive means from the rotating component until the rotating component is contacted by the gloved hand which immediately cuts through the thin plastic and engages the electric conductive glove to operate the safety switch means of the control system.

Another objective is to provide such a control system which prevents injury to the operator upon an electric power failure to the equipment by immediately disconnecting the moving element from the power source and then stopping it.

A further objective is to enable the rotating feed roll to be manually reversed even further after it has been automatically reversed since the power drive connecting clutch is disengaged.

These objectives and advantages are obtained by the improved safety control system of the invention which is intended for use with power operated equipment, in which said system may be stated as including motor means operatively connected to a metal component for moving said component in a forward direction; electrical conductive gloves adapted to be worn by an operator of the power operated equipment; first means for operatively connecting and disconnecting the motor means to and from the moving metal component; second means for positively stopping the movement of the component in the forward direction; and third means for reversing the direction of movement of the metal component to prevent injury to the operator if at least one of the operator's conductive gloves or portion of the operator's body contacts the moving metal component.

BRIEF DESCRIPTION OF THE DRAWINGS

Preferred embodiments of the invention illustrative of the best modes in which applicants' have contemplated applying the principles, are set forth in the following description and are shown in the drawings and are particular and distinctly pointed out and set forth in the appended claims.

FIG. 3 with the clutch in disengaged position;

Similar numerals refer to similar parts throughout the drawings.

DESCRIPTION OF THE PREFERRED EMBODIMENTS

Figure 1:
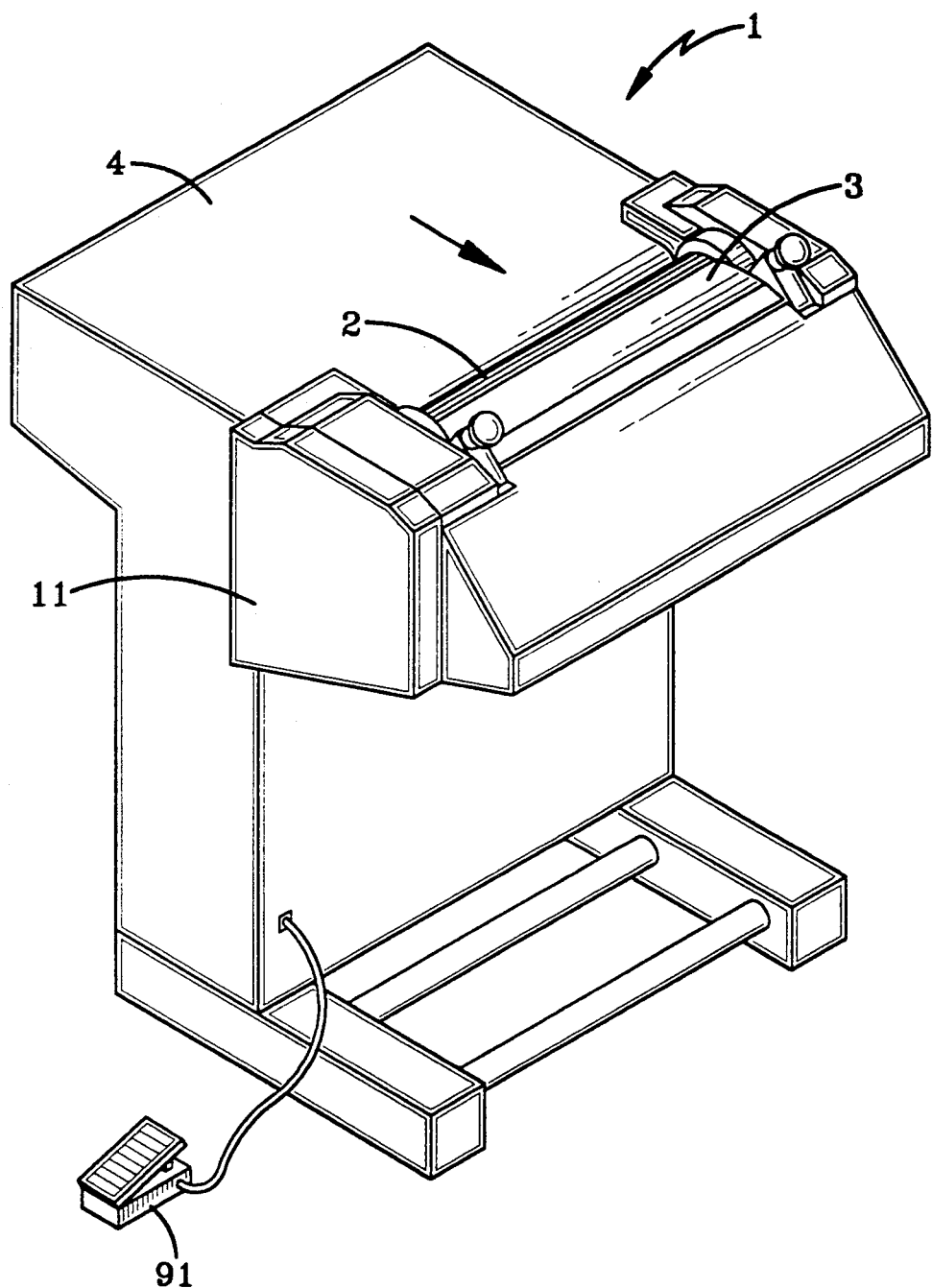
FIG. 1 is a diagrammatic perspective view showing the improved safety control system incorporated into a meat skinning machine.
Figure 2:
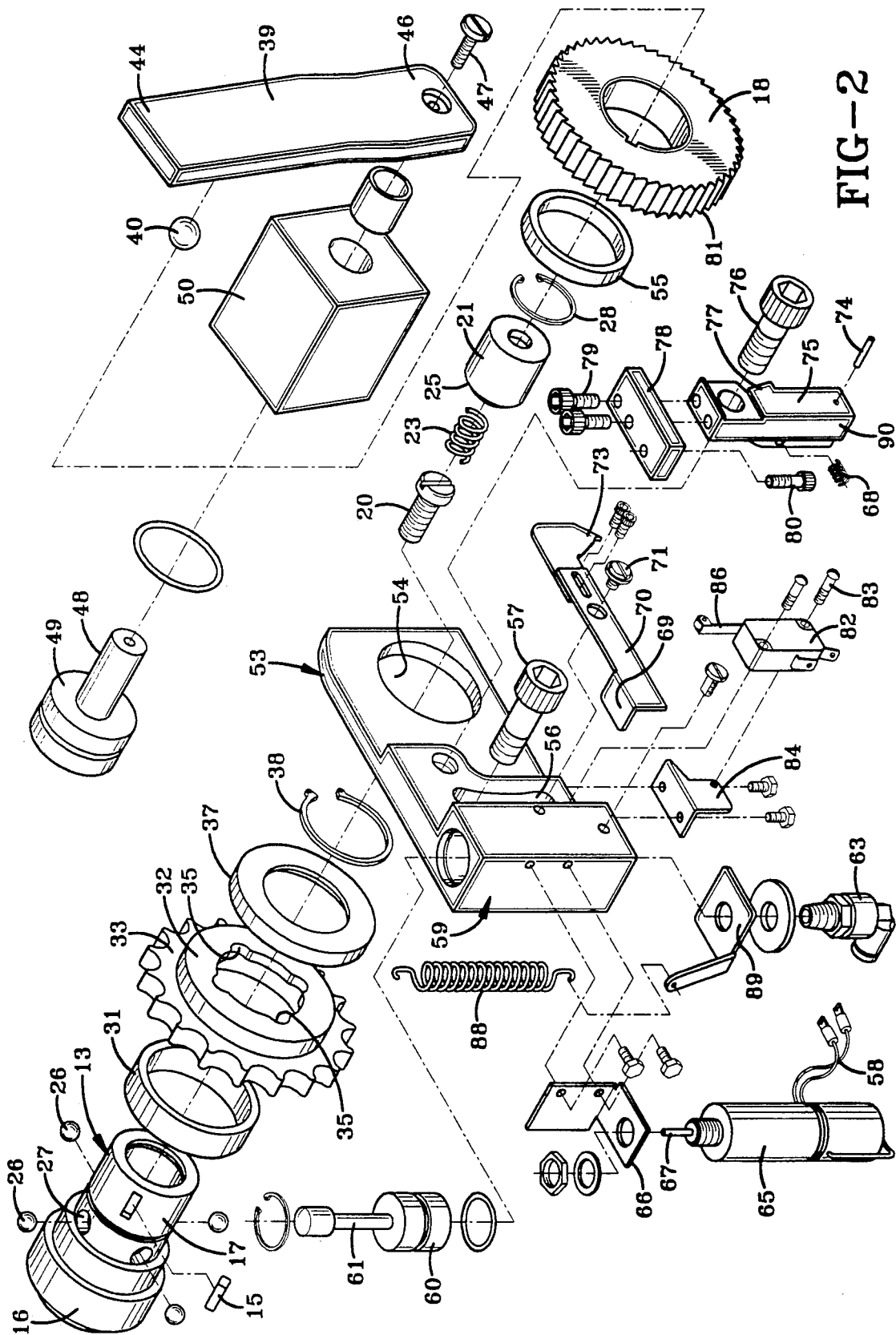
FIG. 2 is an exploded perspective view of a first embodiment of a control mechanism for use in the improved safety control system of the meat skinning machine of FIG. 1.
Figure 3:
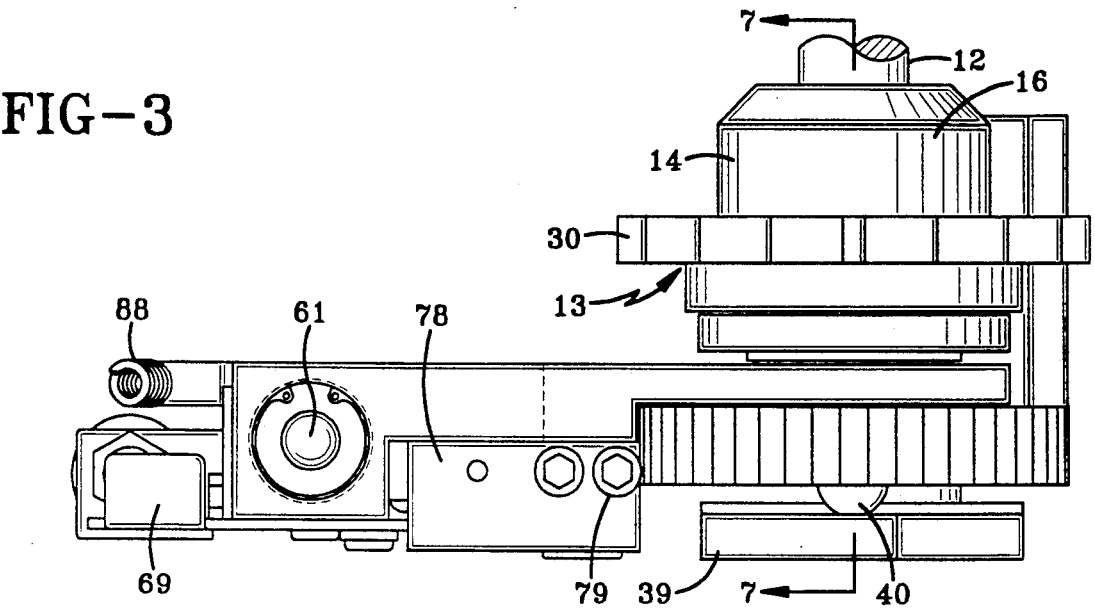
FIG. 3 is a fragmentary top plan view of the control mechanism of FIG. 2 in assembled position, removed from the meat skinning machine of FIG. 1.

A meat skinning machine indicated generally at 1, is shown in FIG. 1 and is one type of equipment with which the improved safety control system of the invention is to be utilized. Skinning machine 1 is of the type having a rotatable product feed shaft 2 which will draw the skin off of a piece of meat such as a ham, whereupon the skin is removed from the ham by an adjacent knife blade 3, as the meat is moved manually along a front shelf 4 by an operator. The other features and details of construction of machine 1 and the manner in which an operator is electrically connected thereto by means of electrodes and mesh metal gloves, is shown and described in detail in U.S. Pat. No. 4,965,909, the contents of which are incorporated herein by reference. The subject invention is a further modification and improvement to the control system of said U.S. Pat. No.

4,965,909, in that it contains a control mechanism which immediately stops the rotation of a rotating metal component such as feed shaft 2 in a novel fashion, as did the safety control system of said U.S. Pat. No. 4,965,909, and then immediately reverses the rotating metal component by use of pressure actuated pistons, instead of the reversible electric motor of the power operated equipment of the above referenced patent.

Figure 14:
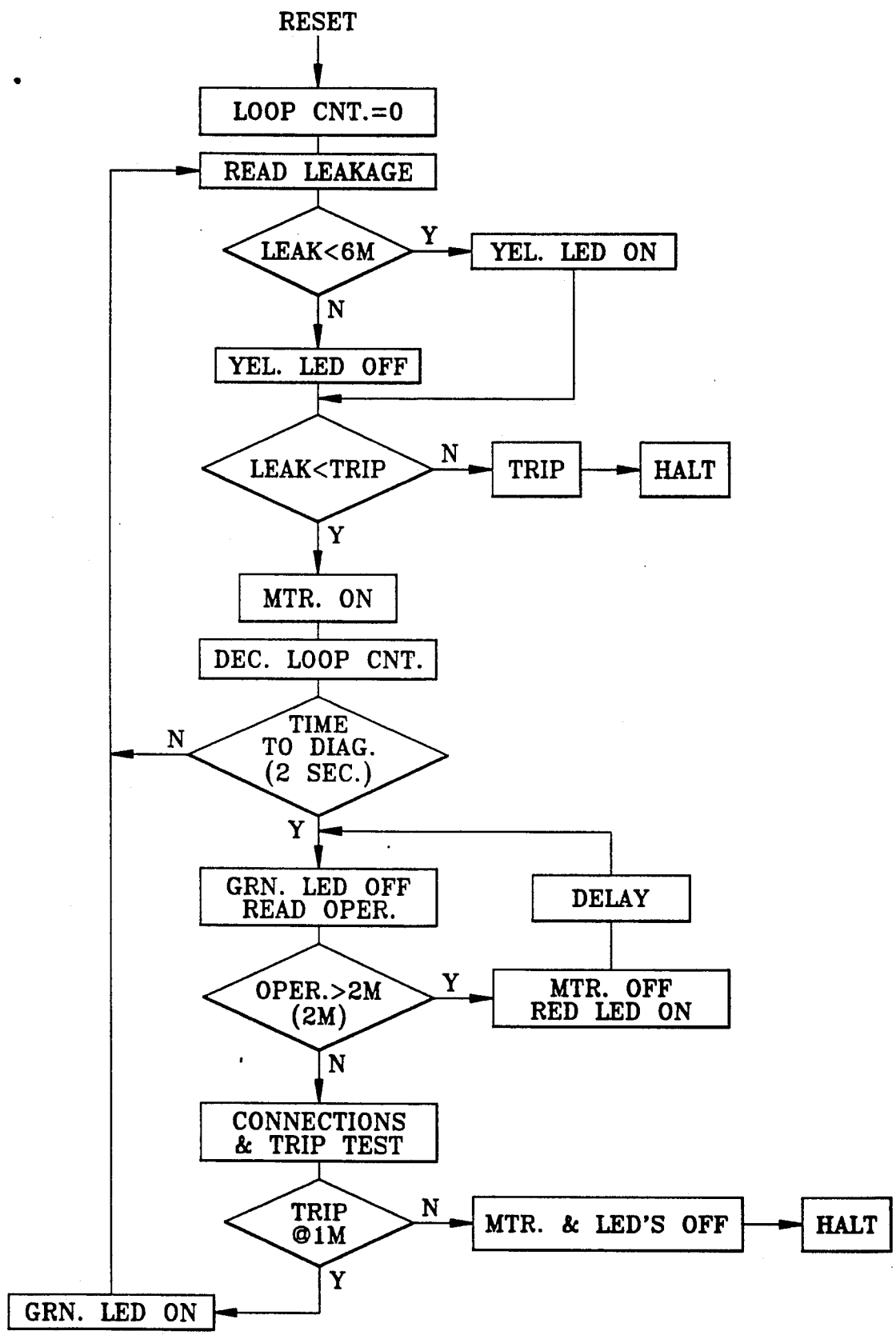
FIG. 14 is a block diagram of the diagnostic program for the safety control system of the invention.
Figure 15:
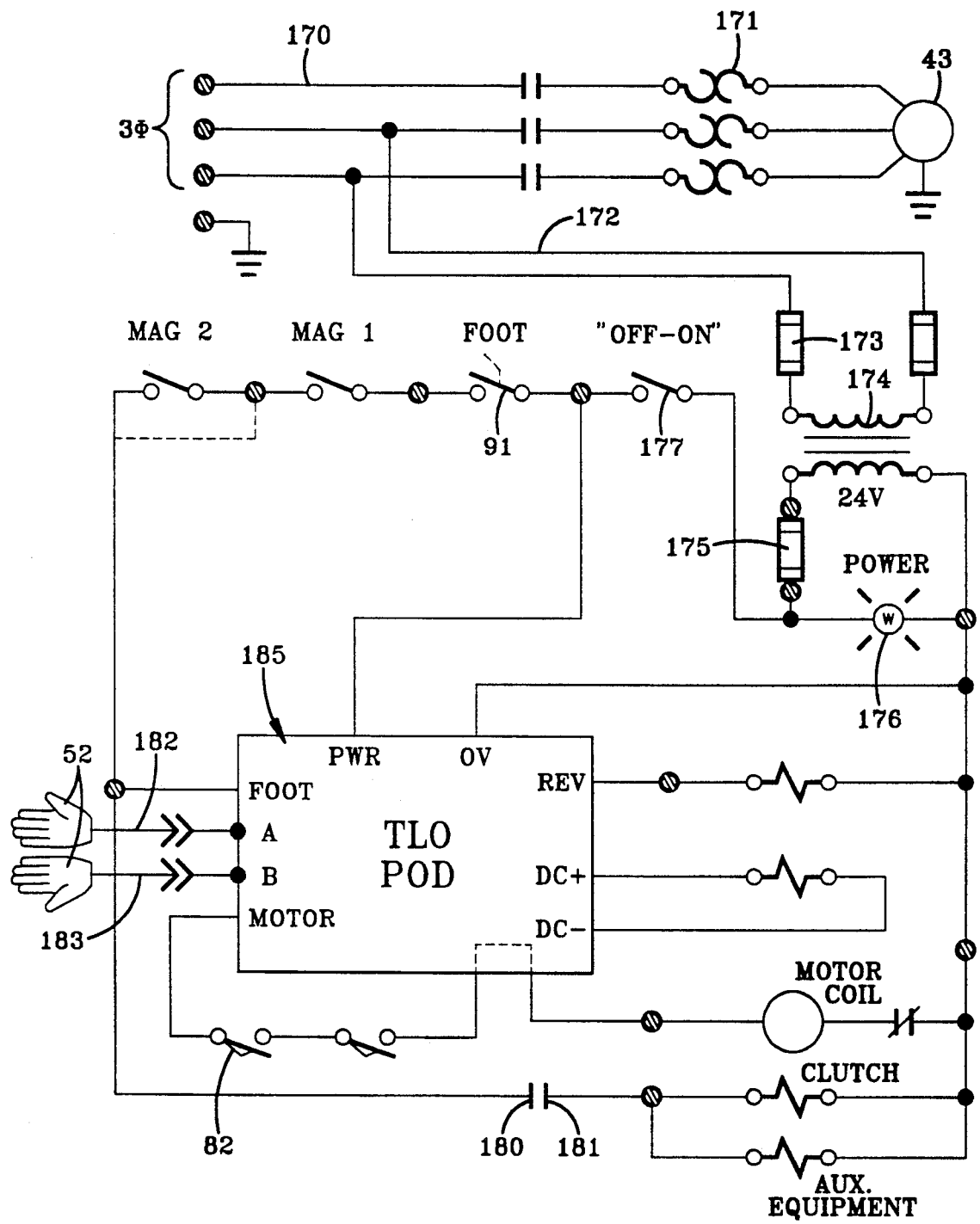
FIG. 15 is a circuit diagram of the control circuitry portion of the safety control system.
Figure 16:
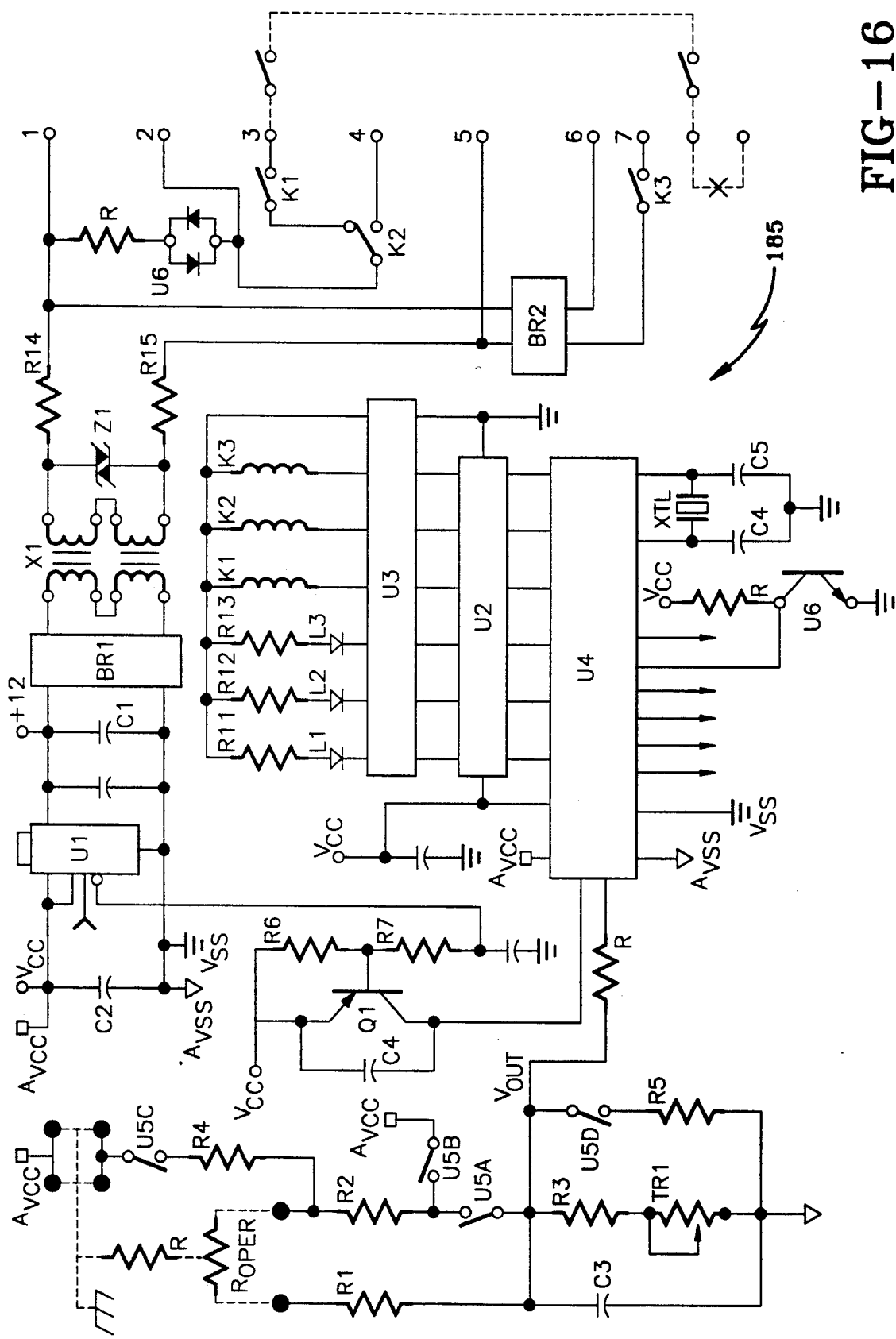
FIG. 16 is a detailed circuit diagram of the components of the TLO POD of FIG. 15.

The improved safety control system of the present invention includes a safety control mechanism which is indicated generally at 10, which is controlled by the electronic circuitry portion of the system shown particularly in FIGS. 14-16. A first embodiment of control mechanism 10 is shown particularly in FIGS. 2-8. Control mechanism 10 is mounted in a side panel of meat skinning machine 1 behind a removable panel 11, where the mechanism is operatively connected to an end 12 of rotatable feed shaft 2. Control mechanism 10 includes a clutch indicated generally at 13, best shown in FIGS. 7 and 8 which includes a hub 14 that is rigidly connected to feed shaft end 12 by a key/keyway connection 15 and a bolt 20. Hub 14 includes a shaft connecting front end portion 16 and an integrally connected rear cylindrical hub portion 17, on which is rigidly mounted a pawl wheel 18 by a key/keyway connection 19. A cylindrical shaped cam 21 is complementary to and is slidably mounted within, the cylindrical interior of cylindrical hub 17 and contains a compression coil spring 23 within the hollow interior thereof. The inner end of cam 21 is formed with an annular tapered camming surface 25 which engages a plurality of camming balls 26 located within complementary shaped holes 27 formed in cylindrical hub 17 of clutch 13, closely adjacent front end portion 16. Cylindrical cam 21 is retained within the interior of clutch hub 17 by a lock ring 28.

A drive sprocket 30 is rotatably mounted on hub 14 by a sleeve bearing 31 and has a cylindrical mounting hub 32 extending from drive sprocket teeth 33 of sprocket 30. This hub is formed with a plurality of equally spaced recesses 35 into which balls 26 are driven by cam 21 for operatively connecting drive sprocket 30 to hub 14 and to shaft end 12. Drive sprocket 30 is maintained on hub 14 by a nylon retaining ring 37 and a locking ring 38. Sprocket 30 is connected by a usual drive chain (not shown) to an electric drive motor 43 of the equipment, as shown in U.S. Pat. No. 4,965,909. Cam 21 is moved in the direction of arrows A (FIG. 8) by a clutch actuating bar 39 which moves a clutch actuating ball 40 against the outer end of cam 21. Movement of ball 40 and cam 21 in the direction of arrows A (FIG. 8), will move balls 26 outwardly in the direction of arrows B, through holes 27, and into drive recesses 35 of drive sprocket 30, to operatively connect drive sprocket 30 to feed shaft 2 through clutch 13.

Figure 4:
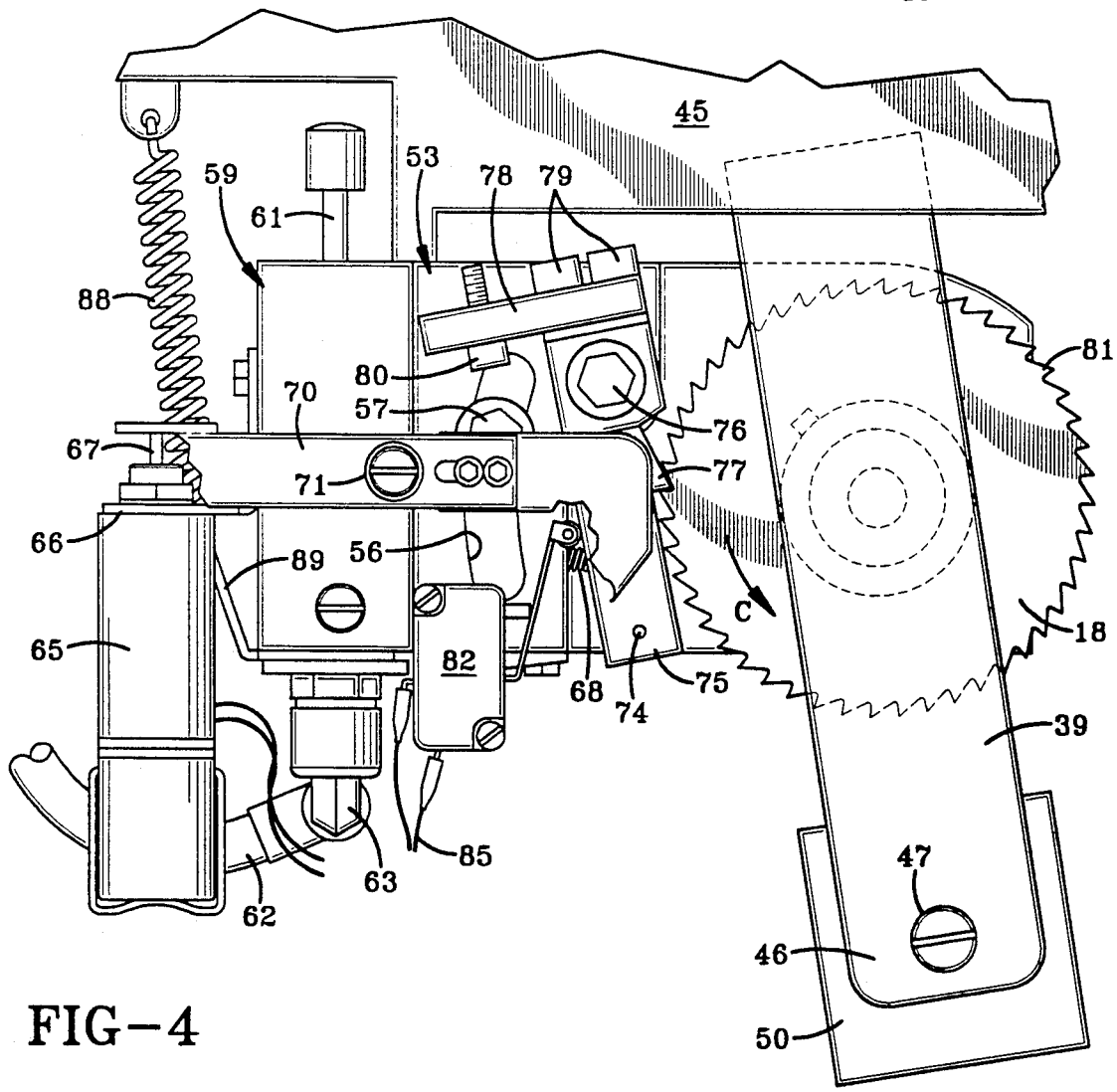
FIG. 4 is a side elevational view of the control mechanism of FIG. 3 showing the cam pawl engaged with the pawl wheel to positively prevent rotation of the metal component.
Figure 5:
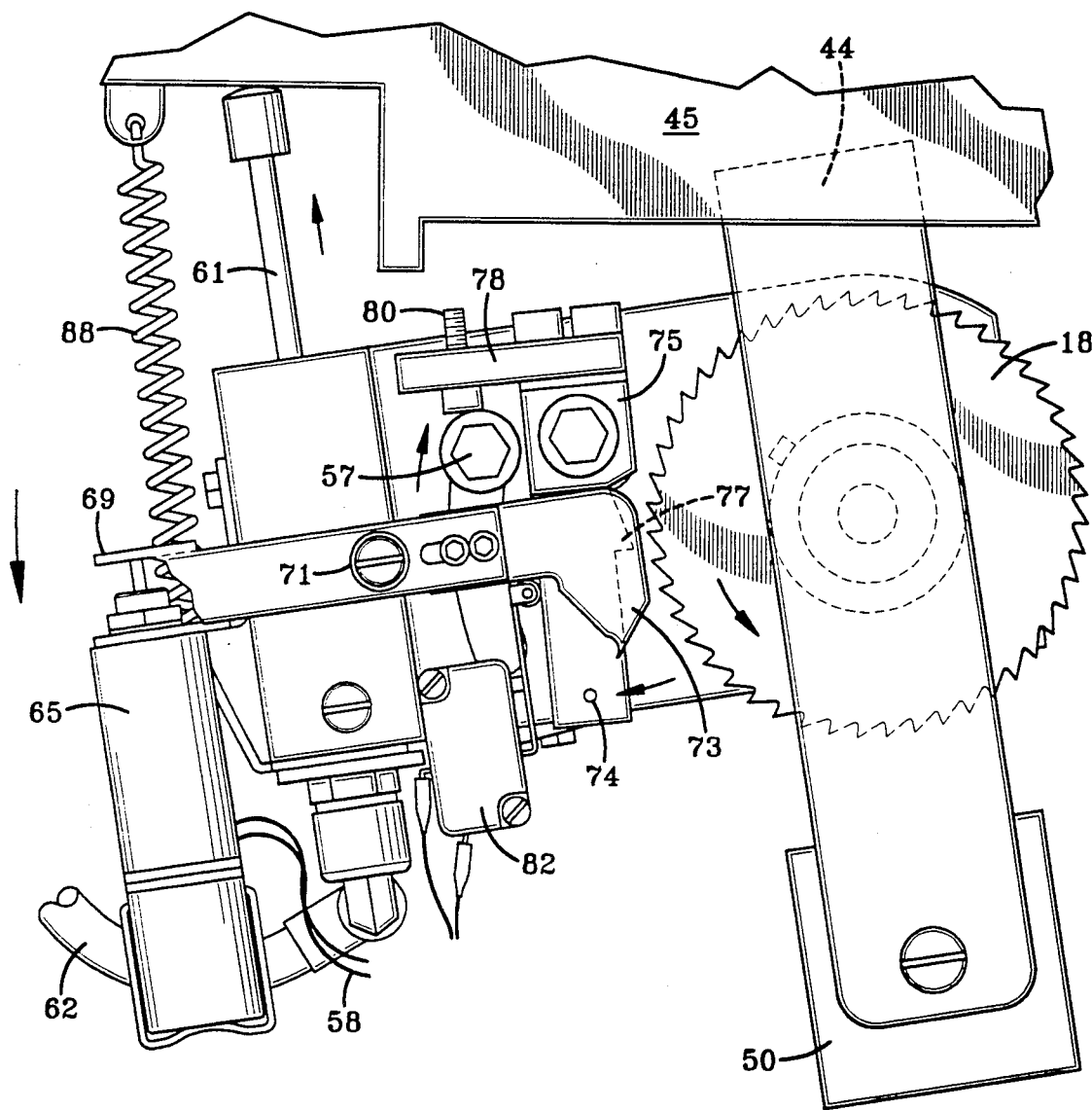
FIG. 5 is a view similar to FIG. 4 showing the pawl disengaged from the pawl wheel prior to engagement with the pawl pin.
Figure 6:
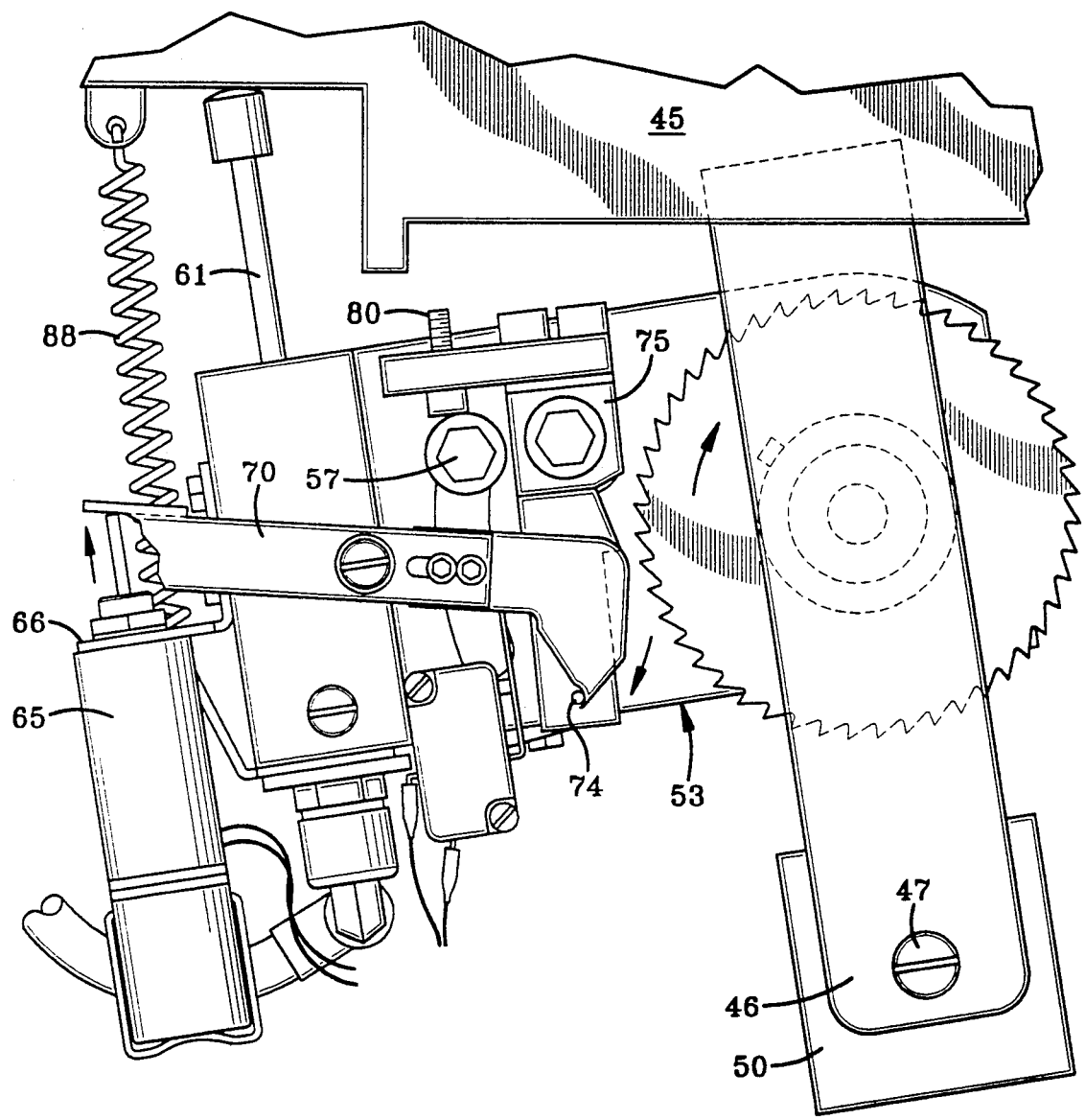
FIG. 6 is a view similar to FIGS. 4 and 5 showing the pawl engaged with the pawl pin when the control mechanism is in the run mode.

An upper end 44 of clutch actuating bar 39 is trapped behind a portion of machine frame 45 as shown in FIGS. 4-6, or secured thereto in some manner, and has its opposite end 46 secured by a bolt 47 to an extended end 48 of a piston 49, which is reciprocally movably mounted in a fluid pressure cylinder 50 which is securely mounted in some manner on the machine frame.

Figure 8:
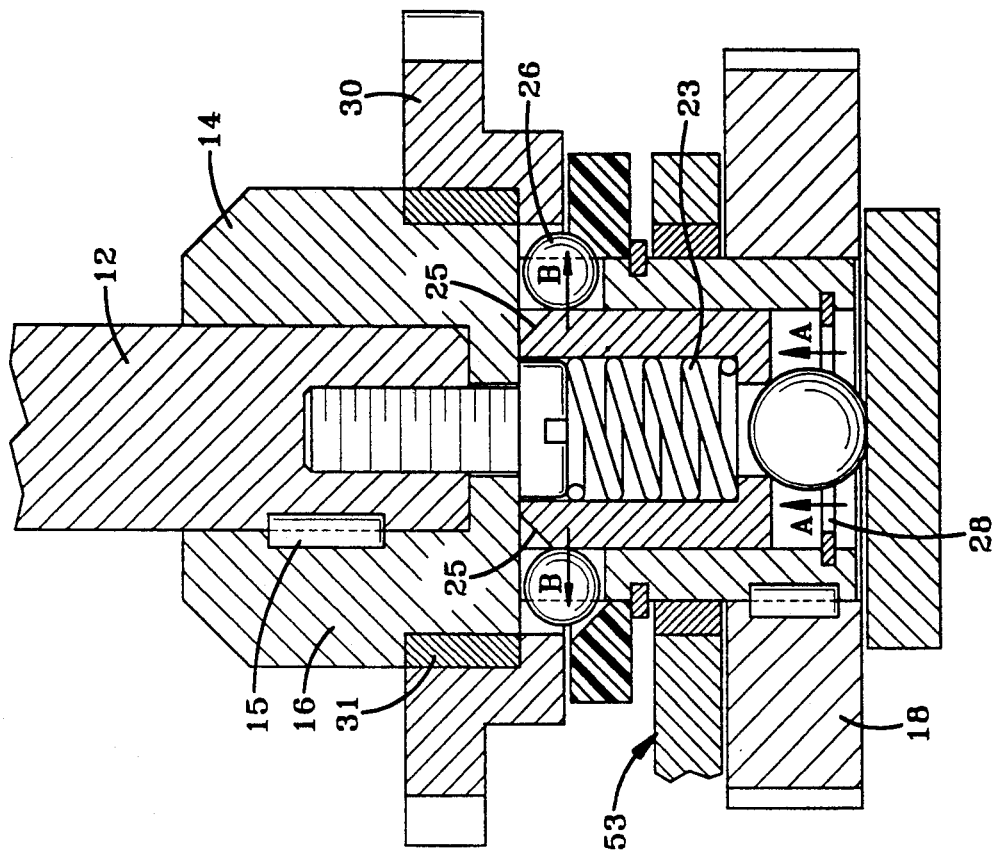
FIG. 8 is a sectional view similar to FIG. 7 showing the clutch in engaged position.
Figure 7:
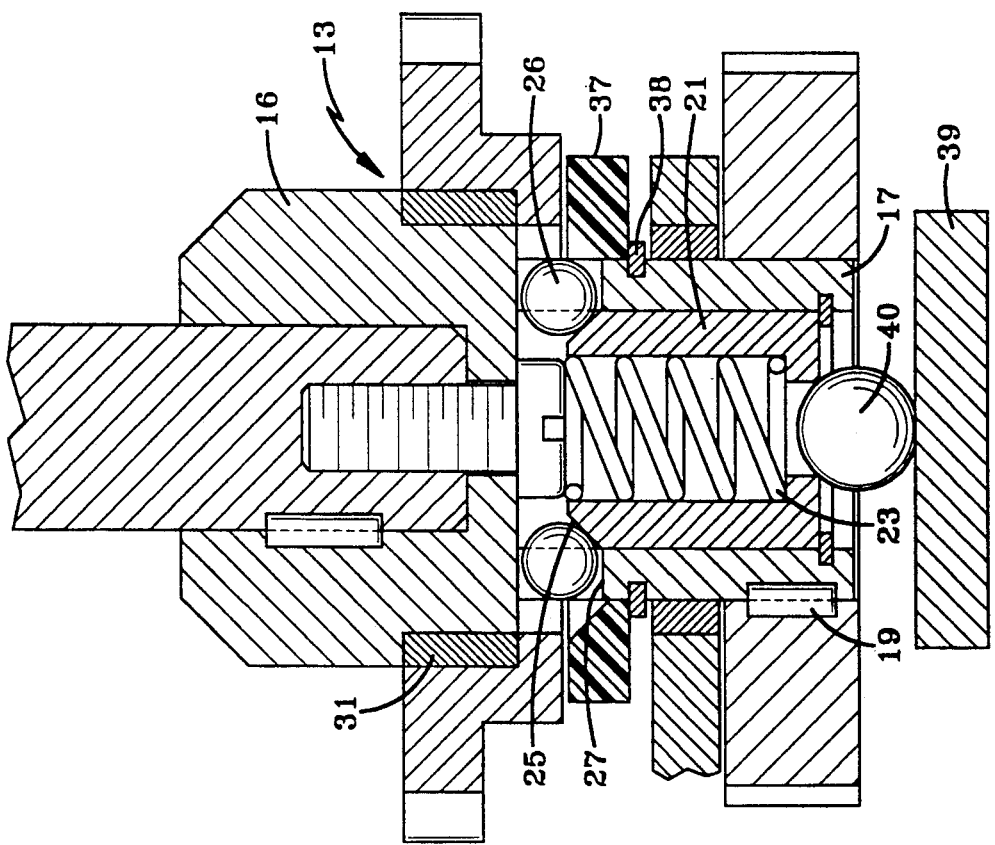
FIG. 7 is an enlarged sectional view taken on line 7—7.

A combination pawl and trigger assembly is movably mounted on hub 14 by a mounting bracket 53. Bracket 53 is formed with a circular opening 54 containing a bronze bushing 55, that is rotatably mounted on cylindrical hub 17 as best shown in FIGS. 7 and 8. Mounting bracket 53 includes an arcuate slot 56 through which extends a cam bolt 57 which limits the pivotal movement of mounting bracket 53 on hub 17. A pawl assembly air cylinder 59 is formed on one end of bracket 53 opposite of mounting opening 54, and has a fluid pressure operated piston 60 movably mounted therein having a piston rod 61 extending upwardly outwardly therefrom. Cylinder 59 is connected to a source of a pressurized fluid, such as air, by means of a fluid line 62 attached thereto by a coupler 63.

An electrically operated trigger solenoid 65 is mounted by a bracket 66 to an end of cylinder 59, and has a plunger 67 which is engageable with a bent end 69 of a trigger 70. Solenoid 65 is connected to a source of electric power by a pair of wires 58. Trigger 70 is pivotally mounted by a bolt 71 on cylinder 59, and includes a pawl engaging end 73 which is adapted to operatively engage a pawl pin 74 which extends outwardly from a pawl 75. Pawl 75 is pivotally mounted on bracket 53 by a bolt 76 and includes a projection 77 which extends outwardly therefrom which is adapted to engage teeth 81 of pawl wheel 18. A pawl engagement cam 78 is secured by bolts 79 to the top of pawl 75 and has a cam adjusting screw 80 extending downwardly from an extended end thereof which engages cam bolt 57 during the operation of the pawl assembly. A compression spring 68 biases pawl 75 in a counter clockwise direction toward engagement with pawl wheel 18.

An electrical control switch 82 is secured by bolts 83 to a bracket 84 which is secured on mounting bracket 53, and is adapted to be connected to the control circuitry of the invention as described in greater detail below, by a pair of wires 85. A trip lever 86 extends outwardly from switch 82 and is engaged with side surface 90 of pawl 75 as shown particularly in FIGS. 2 and 5 for controlling a portion of the operational sequence of the improved control system. Mounting bracket 53 and the various components mounted thereon are biased in an upwardly or clockwise rotational direction by a tension spring 88 which extends from an attachment clip 89 to machine frame 45.

The basic operation of the control mechanism is as follows. When a foot switch 91 (FIG. 1) that is located adjacent machine 1 is depressed by an operator, a computer and associated electronic circuitry looks for the operator's presence by measuring the resistance between the electrical conductive gloves 52 (FIG. 15) worn by the operator. When the computer senses that there is an operator present, it applies air pressure to pawl assembly air cylinder 59 causing plunger 61 to press upwardly against machine frame 45 as shown in FIGS. 5 and 6. This will push the pawl assembly mounting bracket 53 in a counter clockwise direction about shaft end 12, which allows pawl 75 which is already engaged with pawl wheel 18 as shown in FIG. 4, to rotate the pawl wheel in a reverse direction as shown by arrow C in FIG. 4. Since the pawl wheel is rigidly connected to end 12 of feed shaft 2, it rotates the feed shaft 2 in a reverse direction approximately one tooth. Once the pawl wheel has been rotated far enough in a counter clockwise direction, cam bolt 57 engages cam adjusting screw 80 (FIG. 5) which causes pawl 75 to be moved away from engagement with the pawl wheel and causes it to come up against pawl position switch 82. Switch 82 then energizes the motor drive circuit as described in detail below, and allows the motor to rotate drive sprocket 30 through the engagement of clutch 13. This movement also enables air to be supplied to clutch cylinder 50 which engages clutch 13 by pressing ball 40 inwardly toward camming cylinder 17. Slightly previous to this time, 24 volts is applied to trigger solenoid 65 through wires 58 causing the trigger solenoid to energize, forcing plunger 67 outwardly of the solenoid and into contact with trigger end 69 causing the trigger to pivot about its mounting bolt 71, engaging trigger end 73 with pawl pin 74, as shown in FIG. 6. This will cause the pawl to stay engaged with the pawl position switch 82 and cause it to stay out of engagement with the pawl wheel so the meat skinning machine 1 will operate with feed shaft 2 revolving at its desired speed.

Machine 1 will continue to run in this run mode until there is an event indicating an unsafe condition, such as the operator's metal mesh glove or body contacting a certain component of the skinning machine such as tooth feed roll 2, knife blade 3, shelf 4 or other metal component, which will indicate an unsafe condition to the control circuitry. In most situations, the component will cut through the moisture impervious gloves, usually plastic, which are worn over the conductive gloves and contact the glove to actuate the control system. However, it is possible that another part of the operator's body, such as a wrist, arm, etc. will contact the metal component which will actuate the control system. The gloves provide a first line of defense to the operator's safety. The control circuitry as described below, will then cause trigger solenoid 65 to deenergize whereupon plunger 67 will retract allowing the trigger assembly to lift and disengage from pawl pin 74 which allows pawl spring 68 to force the pawl outwardly in a counter clockwise direction whereby pawl projection 77 engages one of the teeth of pawl wheel 18 stopping shaft 2 from rotating, as shown in FIG. 4.

To prevent damage from occurring to the control assembly, clutch cylinder 50 is disengaged and the air bleeds out of the clutch cylinder quickly, allowing clutch actuating ball 40 to move outwardly from the engaged position of FIG. 8 to the disengaged position of FIG. 7 by the force of spring 23, so that drive sprocket 30 no longer drives feed shaft 2. This enables pawl wheel 18 and pawl projection 77 to completely stop any continued forward rotation of shaft 2. Additionally, about 200 milliseconds after this event occurs, a computer in the control circuitry, indicated as TLO POD, will enable pressurized air to be supplied to pawl assembly air cylinder 59 causing mounting bracket 53 to pivot in a counter clockwise direction about shaft end 12 due to the outward extension of cylinder plunger 61, causing the pawl and pawl wheel to rotate feed shaft 2 in the reverse direction one tooth at a time, best shown in FIG. 4. This action occurs twice in rapid sequence to provide for a reversal of pawl wheel 18 and correspondingly of feed shaft 2, which is sufficient to prevent trapping of an operator's finger or glove end between the feed roll and knife blade.

A modified form of the invention is indicated generally at 100, and is shown particularly in FIGS. 9-13. This second embodiment is a band saw used for the trimming of meat or for the cutting of various other materials such as wood, steel, plastic or the like. Band saw 100 is of a usual construction having a cabinet 101 with an electric drive motor 102 mounted on base 103 thereof. Motor 102 drives a pulley 105 which is rotatably mounted on the extended end of a lever arm 106 which is pivotally mounted in a bearing block 107 adjacent motor 102. A continuous power transmission drive belt 108 extends between motor 102 and a drive pulley 109 rotatably mounted on the extended end of lever arm 106 solidly coupled to pulley 105. A usual continuous flexible saw blade 110 extends about motor driven pulley 105 and an upper freely rotatable, pulley 111. Pulley 111 is mounted in a protective top closure 112 provided with a hingedly mounted access door 113.

Figure 9:
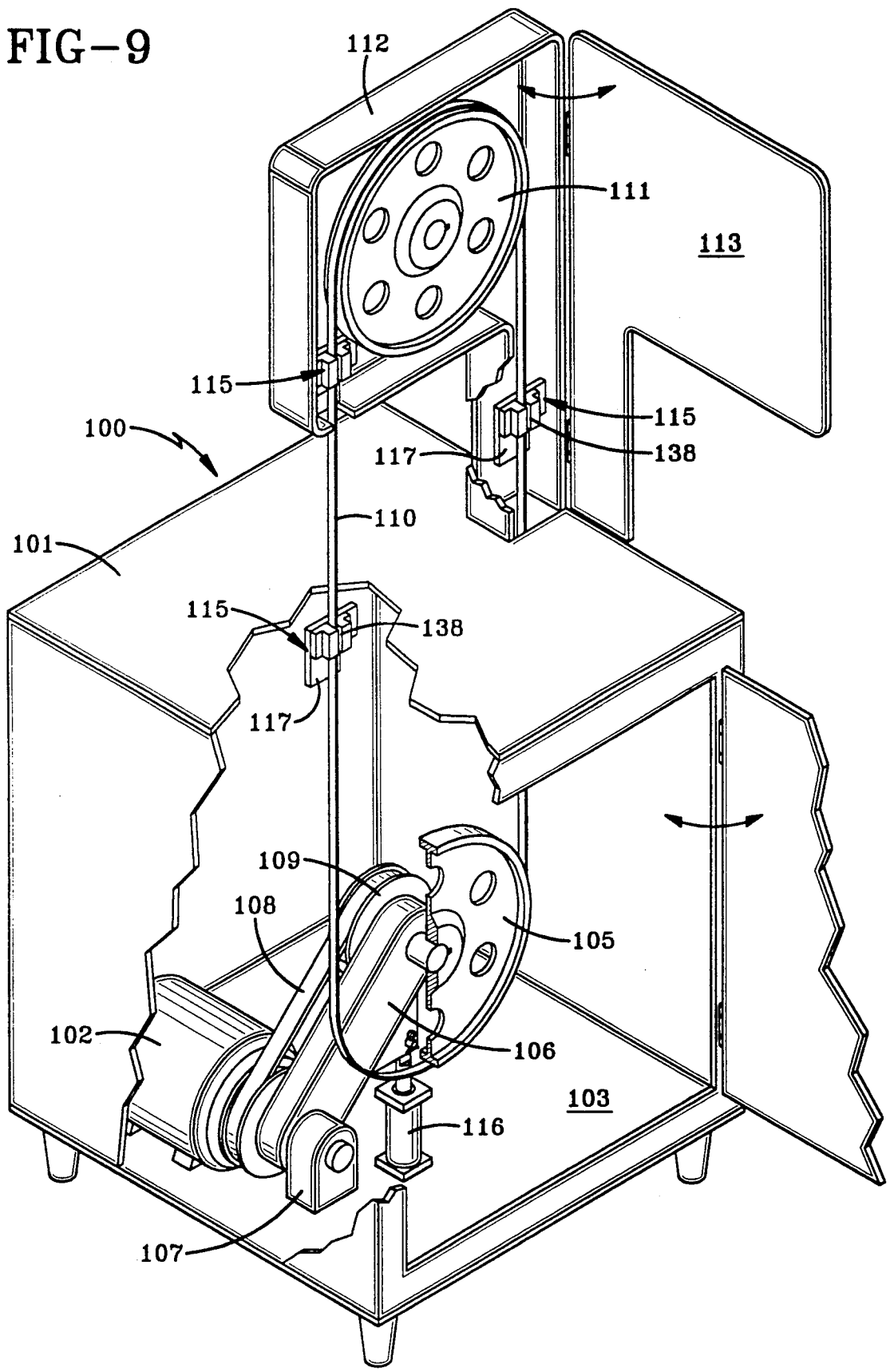
FIG. 9 is a fragmentary perspective view with portions broken away and in section, showing a band saw having the improved safety control system incorporated therein.

In accordance with the invention, a number of a control mechanism 115, shown diagrammatically in FIG. 9, are mounted at spaced locations in cabinet 101 and top closure 112. Two such control mechanisms 115 are mounted within top closure 112, with a third being mounted within cabinet 101. Control mechanisms 115 are similar in most respects to control mechanism 10 described previously above for use with trimming machine 1. A band tensioning cylinder 116 is mounted on base 103 and is connected to lever arm 106 for applying and relieving tension on blade 110 as discussed in greater detail below.

The details of control mechanism 115 are shown in FIGS. 10-13. Control mechanism 115 includes a mounting plate 117 firmly mounted on the cabinet or top closure by bolts 114. Plate 117 is provided with a fixed slide block 118 (FIG. 13) securely mounted to plate 117 by bolts 119 which is formed with a slide channel 120 therein. A wedge block 121 is slidably mounted in channel 120 of block 118 and has a central cutout region 122 through which band saw blade 110 moves in a downwardly vertical cutting direction. It is readily understood that saw blade 110 will have a plurality of cutting teeth formed thereon.

A fluid pressure cylinder 125 is mounted by a support bracket 126 onto mounting plate 117, and is adapted to be connected to a source of high pressure fluid such as air, through a fluid line 127. A piston rod 128 of cylinder 125, is connected to a bracket 129 that is connected to wedge block 121 so as to effect sliding movement of block 121 within slide block 118 upon actuation of piston rod 128. A tension spring 130 biases wedge block 121 in a downward direction within slide channel 120.

A strip of friction material 131 is mounted and extends along a vertical side surface 132 of wedge block 121 adjacent cutout region 122. A tapered camming surface 133 is formed in Wedge block 121 opposite of friction strip 131, and is adapted to slidably engage a tapered wedge 134. Wedge 134 has a tapered surface 135 complementary to the taper of wedge block surface 133, and a vertical surface 136 which also may have friction material thereon for clamping against saw blade 110. A slot 138 is formed between friction material 131 and wedge surface 136 through which blade 110 extends. Wedge 134 is moved along camming surface 133 by a cocking lever 139 which is pivotally mounted by a bolt 140 on a front face of wedge block 121. Lever 139 is formed with a circular cutout 141 at one end thereof, in which is seated a rod 142 which projects outwardly from a front surface of wedge 134. The opposite end of lever 139 is formed with an outwardly projecting pin 144. A tension spring 145 extends between a bracket 146 on lever 139 and a bracket 150 mounted on wedge block 121, and biases lever 139 in a counter clockwise direction whereby rod 142 and attached wedge 134 is biased in a downwardly direction as viewed in FIGS. 10-13.

A trigger assembly 147 is mounted on plate 117 and includes a trigger 148 which is pivotally mounted by a bolt 149 on mounting plate 117. A wedge pin engaging end 151 is adjustably mounted by a plurality of set screws 152 on trigger 148, and has a pointed end 153 which operatively engages wedge pin 144. The opposite end of trigger 148 is formed with a bent end 155 which is engaged by a plunger 156 of an electrically actuated trigger solenoid 157, which is connected to the control circuitry by a pair of wires 158.

A wedge position switch 160 is mounted on wedge block 121 by bolts 161 and is connected by a pair of wires 162 to the control circuitry. Switch 160 includes a switch actuating arm 163 which is engaged with a pin 164 that extends outwardly from an upper portion of wedge 134.

The method of operation of the band saw control mechanism 115 is similar to, and many parts are analogous to, the parts and the operation of control mechanism 10 of skinning machine 1. The moving metal element of band saw 100 is blade 110 which moves in a vertical direction through slots 138 of control mechanisms 115, adjacent to wedge 134 at a high velocity. This is analogous to pawl 75 of skinning machine 1 which comes into engagement with pawl wheel 18 and functions as the stopping element.

Figure 11:
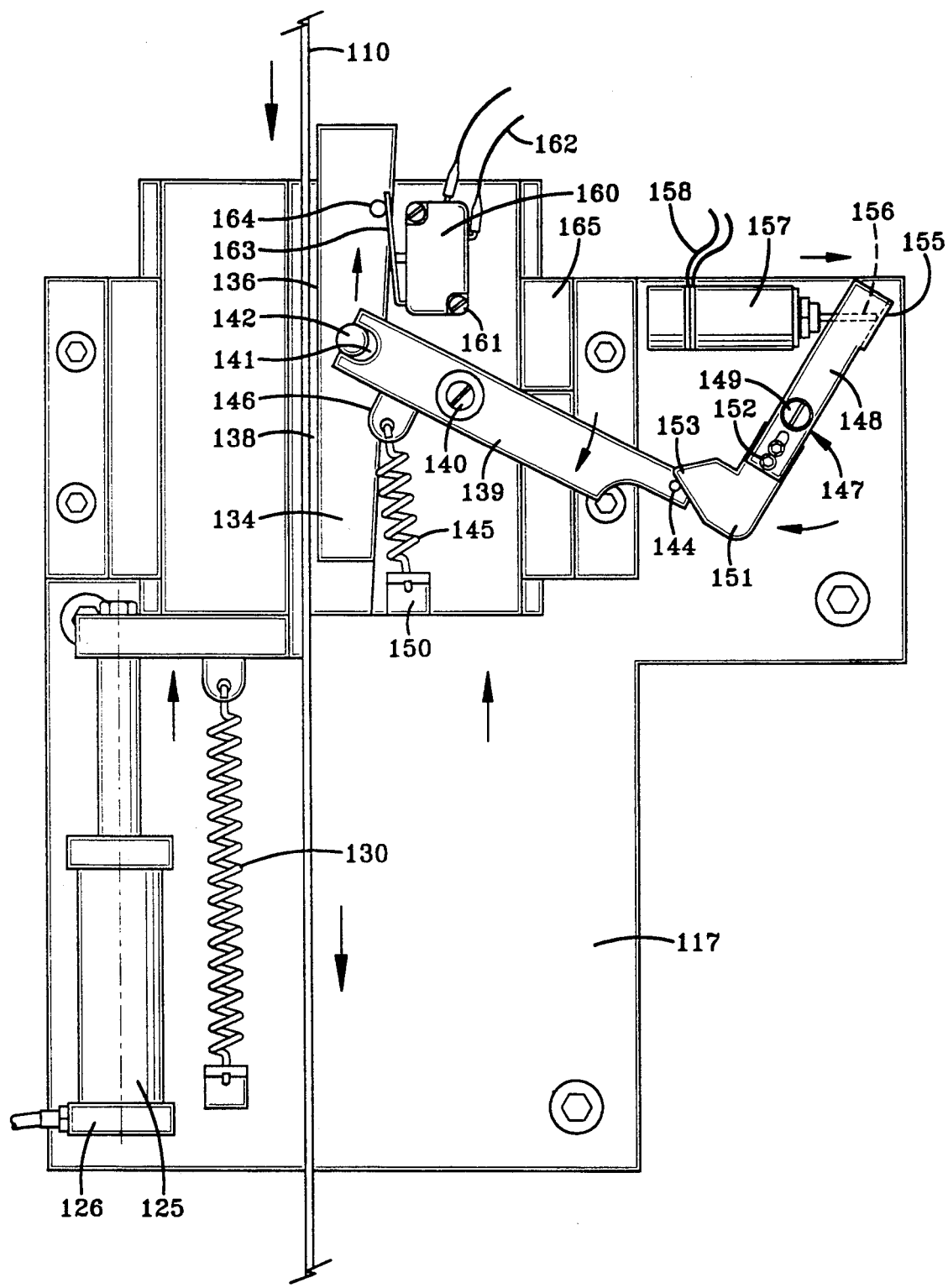
FIG. 11 is a view similar to FIG. 10 showing the wedge block and wedge in engaged position with the saw blade and in the reversing mode.

When the operator turns the band saw ON and applies power to the electronic control circuitry, the circuitry checks to see if the operator is wearing a glove. When the circuitry sees the resistance of the human body it satisfies the logic circuit of the control circuitry and allows pressurized air to be supplied to cylinder 125 which lifts wedge block 121 upwardly into a position which enables cocking lever 139 to hit an outwardly extending protuberance 165 which is formed as a part of stationary slide block 118 (FIG. 11). As lever 139 comes into contact with stationary protuberance 165 it forces wedge 134 in an upward direction through its engagement in lever cutout 141 so that it loosens the wedging connection previously existing with the vertical surface 136 of wedge 134. Wedge 134 is raised vertically to a position which actuates switch 160 allowing motor 102 to be energized through the control circuitry. The control circuitry also supplies air to band tension cylinder 116 (FIG. 9) which pivots lever arm 106 in a clockwise direction applying tension to saw blade 110.

The band saw continues to run because wedge cocking lever 139 is held in the raised position as shown in FIG. 11, wherein wedge 134 is out of contact with blade 110 by trigger assembly 147. Trigger 148 is held in its cocked position by trigger solenoid 157 which pushes outwardly on bent end 155 of trigger 148. This action moves pointed end 153 into holding engagement with pin 144 of cocking lever 139.

Figure 12:
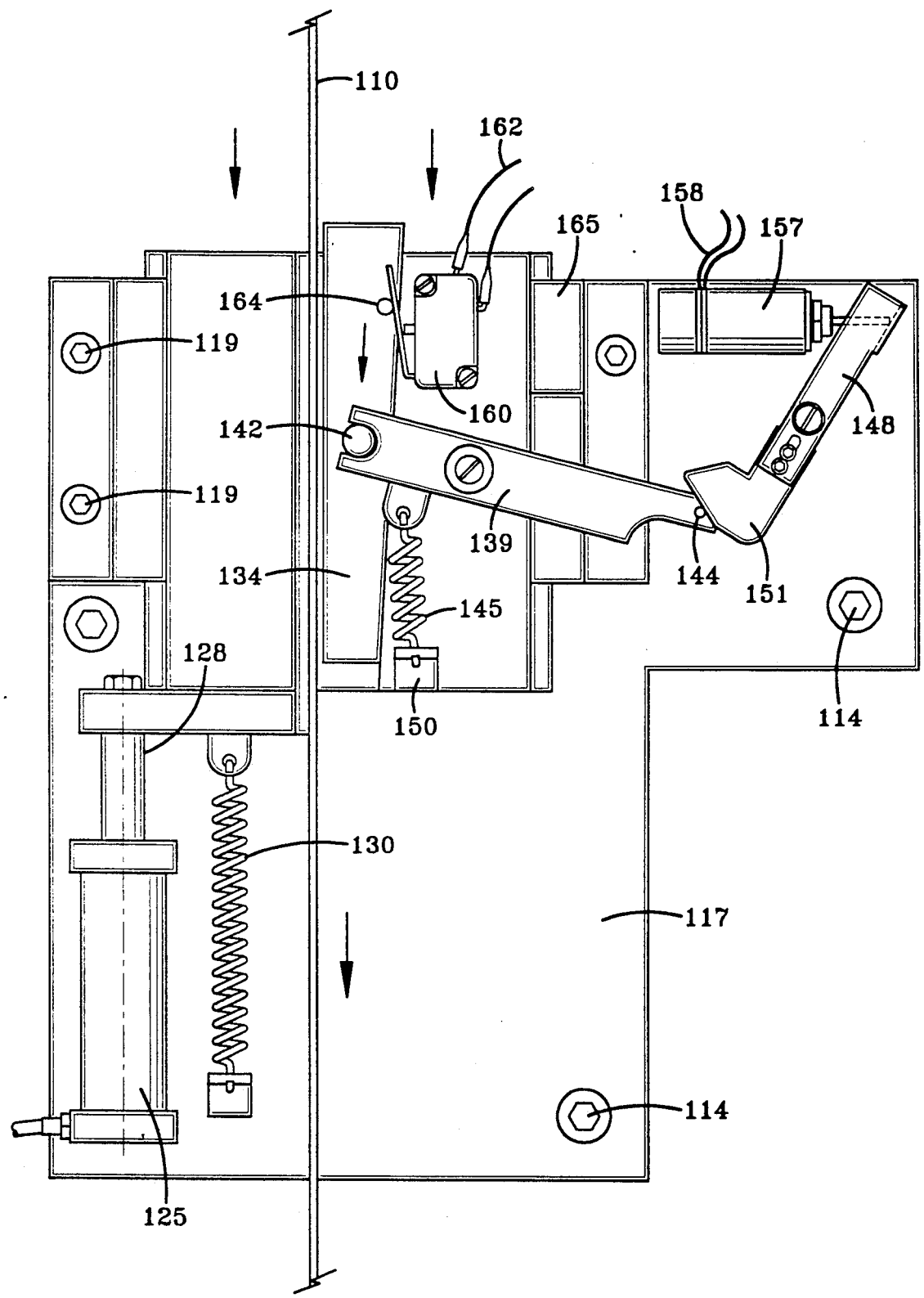
FIG. 12 is a view similar to FIG. 11 showing the wedge block and wedge in disengaged position when the saw blade is in the run mode.
Figure 13:
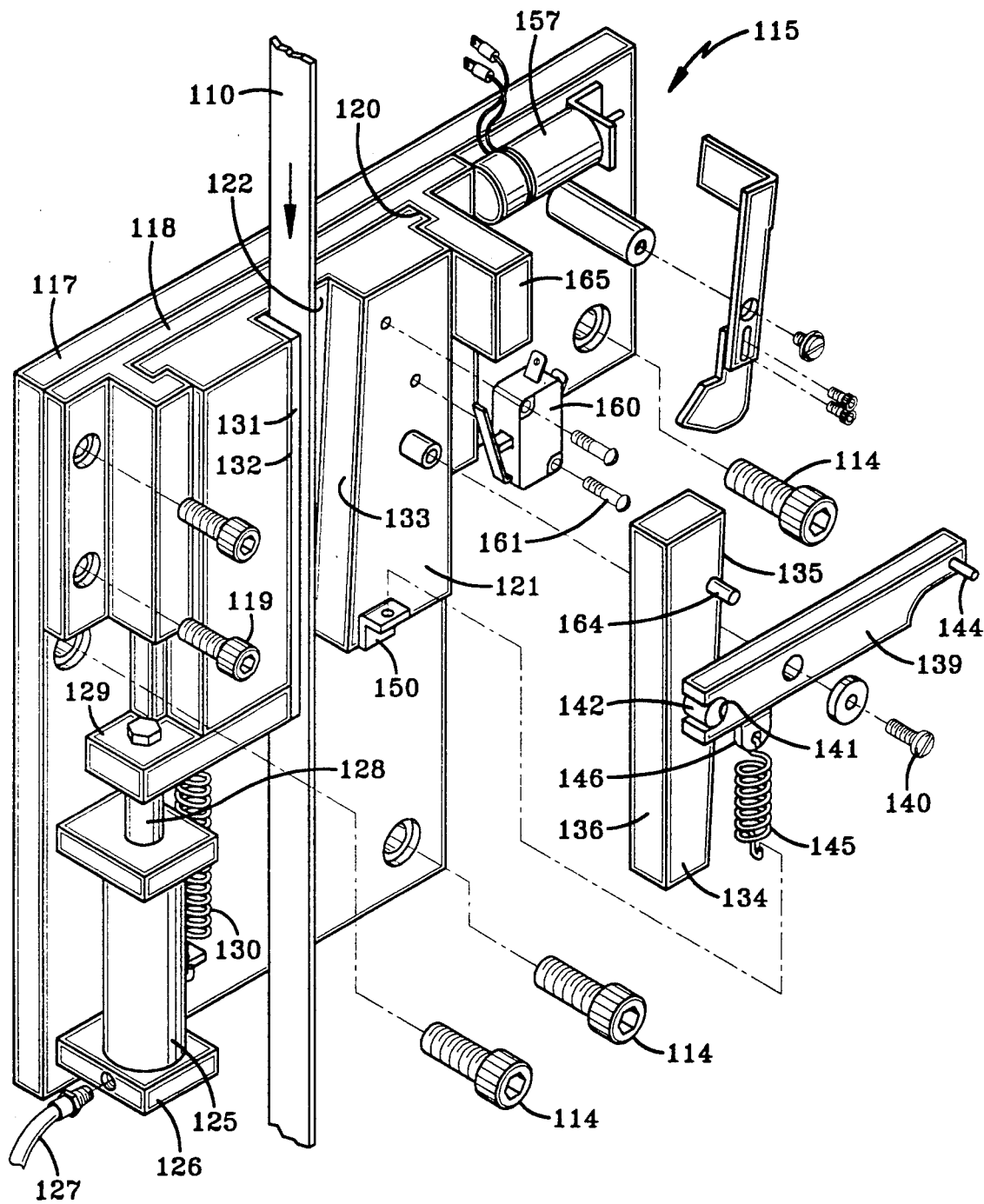
FIG. 13 is an exploded perspective view of the components of the control mechanism shown assembled in FIGS. 10-12.

After the control circuitry sees that the wedge positioning switch 160 is actuated, it removes the air pressure from cylinder 125 and allows spring 130 to return wedge block 121 to its lower position as shown in FIG. 12. This lower or run position, is the position beyond which piston rod 128 cannot go further into cylinder 125. The band saw then continues to run with no interference until there is an event where the safety glove of the operator comes into contact with the moving element or saw blade 110. When such an event occurs, trigger solenoid 157 is actuated allowing trigger lever 148 to pivot in a counter clockwise direction disengaging pointed end 153 thereof from cocking lever pin 144. Because of the geometry of the trigger assembly, it allows pin 144 to move past pointed end 153 immediately upon retraction of solenoid plunger 156 due to the pivotal movement of cocking lever 139 under the influence of a tension spring 145 which extends between the cocking lever and lower end of wedge block 121. This movement of cocking lever 139 enables wedge 134 to drop vertically downwardly by gravity, in addition to the force being applied thereto by spring 145. This causes the wedge to move into cutout region 122, quickly coming into contact with the moving saw blade, whereupon the blade is pulled further into the contact with the wedge causing a large force to be exerted in the horizontal direction pinching the saw blade between friction surface 131 of wedge block 121 and the vertical friction surface 136 of wedge 134, immediately stopping any continued movement of blade 110. The higher the velocity of the saw blade, the more energy that is generated in a downward force which creates a greater energy to be generated in a sideway or horizontal force to stop the blade movement. At the time such an event occurs, not only is trigger solenoid 157 actuated but saw blade tension cylinder 116 is deenergized. This allows the blade to become loose about pulley 105 stopping the drive connection therebetween.

Nearly instantaneously with the stopping of blade 110, solenoid 125 is reactuated and moves wedge block 121, trapped blade 110 and wedge 134 upwardly in unison. This action, as with the reversal of feed shaft 2 discussed above, further reduces possible injury to the operator by preventing his gloves or finger from remaining pinched between the saw blade and other band saw component.

Preferably three control mechanisms 115 for gripping and stopping the movement of blade 112 are provided, two being located above the table within enclosure 112 and the other inside cabinet 101. This arrangement ensures that should blade 110 break, only very small segments of it will remain which could continue to fly around since the remaining portions of the blade are contained within the closed spaces of the machine, thereby preventing injury to the operator.

Figure 10:
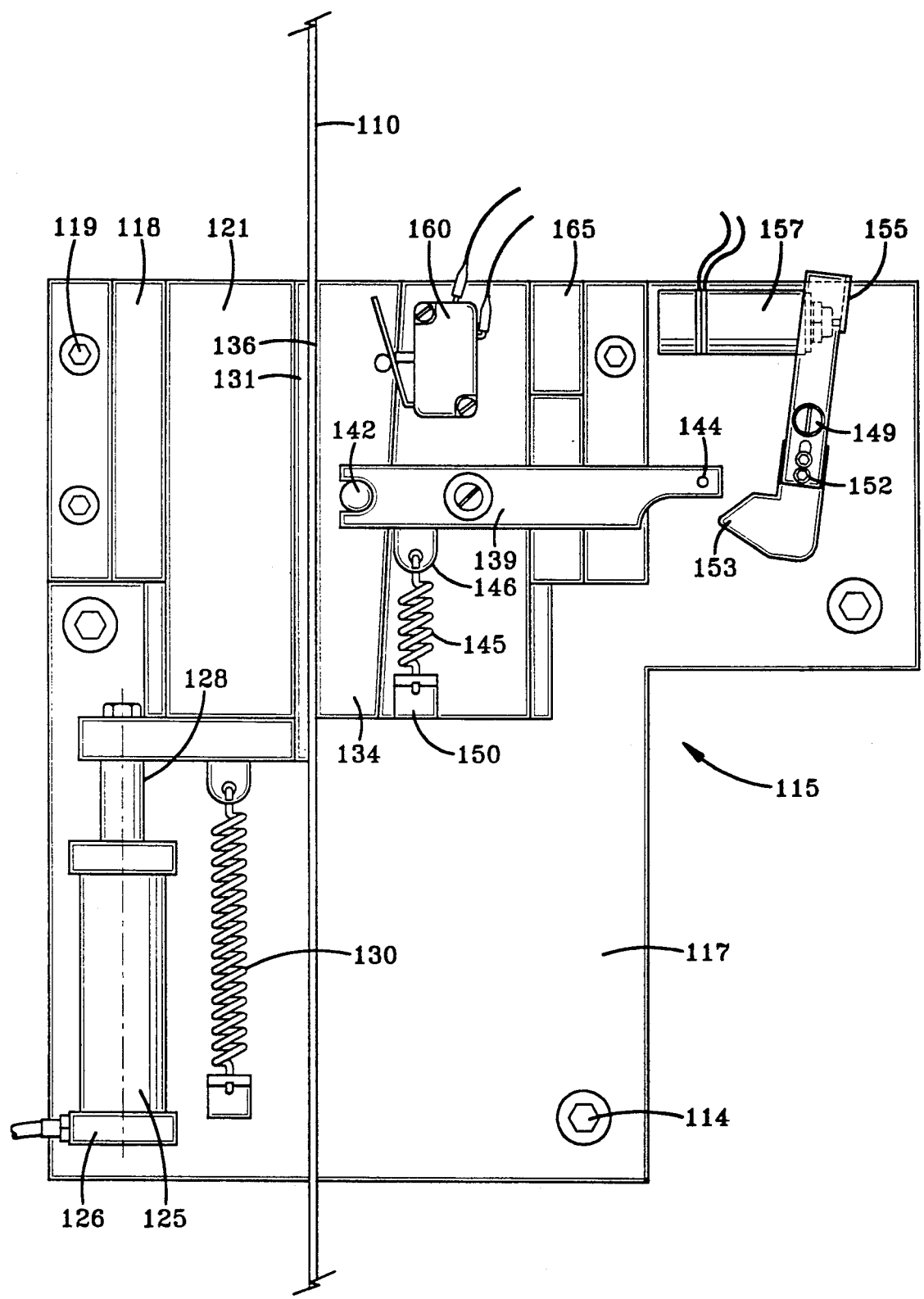
FIG. 10 is a side elevational view of the control mechanism portion of the control system of the band saw of FIG. 9 with the stopping wedge being in engaged position with the band saw blade.

It is not expected that the blade will break, therefore the machine can be restarted by the operator by simply turning off the machine and turning it back on whereupon the startup sequence reinitiates itself and cylinder 125, which has since returned to its lowered position as shown in FIG. 10, is energized causing the trapped blade to back up until the wedge is released as the wedge cocking lever comes against the stationary protuberance. Then the machine starts and continues to run until another event occurs.

FIGS. 14, 15 and 16 show the control circuitry and logic used for operation of control mechanisms 10 and 115 described above. FIG. 14 is a flow chart logic sequence which performs a diagnostic check of the control circuitry and connected machine components so that when the foot pedal is depressed it ensures that the operator's gloves, boots, etc. do not have excess current leakage. If excessive leakage is indicated it provides an advance warning to the operator, followed by a machine stop control sequence as needed by the mechanical components. This logic circuit also checks the electronic control circuitry to ensure that it is functioning properly and that a satisfactory electrode connection between the operator and the metal gloves exists.

FIG. 15 is a general schematic which shows the major components of the electrical circuitry of the trimming machine and band saw, described briefly below. Incoming three phase power will be supplied through lines 170 to the drive motor 43 of skinning machine 1 and to motor 102 of band saw 100, through overload proteotors 171. The power to the remaining electronic circuitry is supplied by lines 172 which tap off of a pair of lines 170 and pass through protective fuses 173 before connecting to a transformer 174. The transformer drops the voltage to 24 volts AC on the output side, which is the preferred voltage for operating the electronic circuitry. A second fuse 175 is connected to the low side of transformer 174 and to a power indicating light 176 which indicates that the machine is plugged in and power is being supplied thereto. As soon as the machine is plugged in light 176 is actuated.

Power is routed through ON/OFF switch 177 which is controlled by the operator pedal 91 as shown in FIG. 1. MAG 1 and MAG 2 are machine interlocks to ensure that a cabinet door is closed or that the guide shelf 4 is in correct position, or that other similar safety interlocks are in place. If the interlocks are closed and foot pedal 91 depressed, power then is supplied to the TLO POD 185 (computer) and to contact points 180 and 181 which will then actuate the clutch 13 of meat skinning machine 1 as described above in order to start the motor. When the TLO POD is energized, it will begin to execute its control sequence by applying power to the pawl limit switch 82. The wires from the operator's glove 52 are indicated at 182 and 183 and are connected to the TLO POD 185.

FIG. 17 is a detailed schematic diagram of the circuitry of the TLO POD 185 which enables the system to operate in the desired sequence.

It is readily understood that other types of control circuitries and logic circuits could be utilized without affecting the concept of the invention, with that shown in FIGS. 14-16 being the preferred arrangement.

Thus, the improved safety control system provides for the immediate detection of an operator's glove or body part coming into contact with a moving metal component of a power operated machine, such as a rotating tooth feed roll 2 or an orbiting band saw blade 110, or contacting another metal part of the machine, and then nearly simultaneously disconnecting the power drive means from the moving element and positively gripping and stopping the moving element, followed by the immediate reversal of direction of movement of the moving element to further reduce possible injury to the operator.

By removing the drive means from the moving element only the mass and inertia of the moving element must be stopped and then reversed. Such a mass and moving energy to be dissipated is considerably less than that which would be required if the drive means were not disconnected as in prior art control systems.

Accordingly, the safety control system for power operated equipment is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved safety control system for power operated equipment is constructed and used, the characteristics of the construction, and the advantageous, new and useful results obtained; the new and useful structures, devices, elements, arrangements, parts and combinations, are set forth in the appended claims.

We claim:

1. A safety control system for power operated equipment of the type having a moving metal component including:
   a) motor means operatively connected to the metal component for moving said component in a forward direction;
   b) electrical conductive gloves adapted to be worn by an operator of the power operated equipment;
   c) first means for operatively connecting and disconnecting the motor means to and from the moving metal component;
   d) second means independent of the motor means for positively stopping the movement of the metal component in the forward direction upon the first means disconnecting the motor means from the moving metal component;
   e) third means independent of the motor means for reversing the direction of movement of the metal component; and
   f) electric circuit means operatively connected to the conductive gloves for controlling the operation of the first, second and third means for preventing injury to the operator if at least one of the operator's conductive gloves or portion of the operator's body contacts the moving metal component.

2. The safety control system defined in claim 1 in which the metal component includes a shaft and a drive sprocket for operatively connecting said shaft to the motor means; and in which the first means includes a clutch for drivingly connecting said shaft to the drive sprocket.

3. The safety control system defined in claim 2 in which the clutch includes a hub attached to the shaft, a plurality of balls, and a movable camming member operatively engaged with the hub and with the balls for moving the balls into driving engagement with the drive sprocket upon contact of one of the operator's gloves with the moving component.

4. The safety control system defined in claim 3 in which a clutch actuation piston is operatively engageable with the movable camming member; and in which said piston moves said camming member into engagement to actuate the clutch.

5. The safety control system defined in claim 2 in which the second means includes a pawl wheel securely mounted on the shaft, a movably mounted pawl located adjacent the pawl wheel, and a trigger assembly operatively engageable with the pawl for permitting said pawl to move into stopping engagement with the pawl wheel.

6. The safety control system defined in claim 5 in which the trigger assembly includes a trigger and a solenoid engageable with the trigger for engaging and disengaging the trigger and the pawl.

7. The safety control system defined in claim 5 further including a trigger assembly mounting plate, said plate being pivotally mounted on the shaft.

8. The safety control system defined in claim 7 in which the trigger assembly mounting plate is formed with an arcuate slot; in which a fixed cam bolt extends through said slot; and in which the pawl has a cam plate adapted to engage the fixed cam bolt upon pivotal movement of the trigger assembly mounting plate to disengage the pawl from the pawl wheel.

9. The safety control system defined in claim 7 in which the third means includes a pressure actuated piston mounted on the trigger assembly mounting plate; and in which said piston pivotally moves the plate and pawl to reverse the movement of the shaft through engagement of the pawl with the pawl wheel.

10. The safety control system defined in claim 7 in which switch means is mounted on the trigger assembly mounting plate and is actuated by the pawl upon disengagement of the pawl from the pawl wheel.

11. The safety control system defined in claim 5 including spring means for biasing the pawl toward stopping engagement with the pawl wheel.

12. The safety control system defined in claim 1 in which the moving component is a blade of a band saw; in which the blade extends about a pair of spaced pulleys; in which one of the pulleys is power driven and is rotatably mounted on a swinging arm; and in which the first means includes a piston connected to said swinging arm for moving said power driven pulley into and out of driving engagement with the blade of the band saw.

13. The safety control system defined in claim 1 in which the moving component is a blade of a saw; in which the second means includes a movable wedge block formed with a cutout; in which a wedge is independently movable within the cutout and forms a slot with a portion of said wedge block through which the blade moves; and in which a lever is engageable with the wedge for moving said wedge toward the slot to pinch the blade against said wedge block portion to stop movement of the blade.

14. The safety control system defined in claim 1 in which the electric circuit means includes a diagnostic logic circuit.

15. A control system for power operated equipment of the type having a moving metal component including:
a) power means operatively connected to the metal component for moving said component in a forward direction;
b) electrical conductive gloves adapted to be worn by an operator of the power operated equipment;
c) first means for operatively connecting and disconnecting the power means to and from the moving metal component;
d) second means independent of the power means for positively stopping the movement of the component in the forward direction upon the first means disconnecting the power means from the moving metal component, and for sequentially reversing the direction of movement of the metal component; and
e) electric circuit means operatively connected to the conductive gloves for controlling the operation of the first and second means for preventing injury to the operator if at least one of the operator's conductive gloves or portion of the operator's body contacts the moving metal component.

16. The control system defined in claim 15 in which the second means includes a stopping member operatively engageable with the moving component for stopping said component, and a trigger assembly engageable with the stopping member for controlling movement of the stopping member into positive stopping engagement with the moving component.

17. The control system defined in claim 16 in which the trigger assembly includes a lever having a first end releasably engageable with the stopping member and a second end actuated by a solenoid for effecting engagement of said first end with the stopping member.

18. A safety control system for power operated equipment of the type having a moving band saw blade including:
a) a pair of spaced pulleys about which the saw blade extends, one of said pulleys being power driven and rotatably mounted on a swinging arm;
b) motor means operatively connected to the power driven pulley for moving the saw blade in a forward direction;
c) electrical conductive gloves adapted to be worn by an operator of the power operated equipment;
d) first means for operatively connecting and disconnecting the motor means to and from the power driven pulley including a piston connected to the swinging arm for moving said power driven pulley into and out of driving engagement with the saw blade;
e) second means for positively stopping the movement of the saw blade in the forward direction;
f) third means for reversing the direction of movement of the saw blade; and
g) electric circuit means operatively connected to the conductive gloves for controlling the operation of the first, second and third means for preventing injury to the operator if at least one of the operator's conductive gloves or portion of the operator's body contacts the moving saw blade.

19. A safety control system for power operated equipment having a moving metal saw blade including:
a) motor means operatively connected to the saw blade for moving said saw blade in a forward direction;
b) electrical conductive gloves adapted to be worn by an operator of the power operated equipment;
c) first means for operatively connecting and disconnecting the motor means to and from the moving saw blade;
d) second means for positively stopping the movement of the saw blade in the forward direction, said second means includes a movable wedge block formed with a cutout, and a wedge independently movable within the cutout and forming a slot with a portion of said wedge block through which the blade moves; and a lever engageable with the wedge for moving said wedge toward the slot to pinch the blade against said wedge block to stop movement of the blade;
e) third means for reversing the direction of movement of the saw blade; and
f) electric circuit means operatively connected to the conductive gloves for controlling the operation of the first, second and third means for preventing injury to the operator if at least one of the operator's conductive gloves or portion of the operator's body contacts the moving saw blade.

20. The safety control system defined in claim 19 in which plunger actuated trigger means is engageable with the lever for controlling movement of said lever and of the wedge.

21. The safety control system defined in claim 20 in which the wedge is spring biased toward pinching engagement with the saw blade; and in which the third means include a pressure actuated piston which is engageable with the wedge block for moving said wedge block, pinched blade and wedge in a reverse direction.

22. The safety control system defined in claim 21 in which the electric circuit means includes a sensor mounted on the wedge block; and in which said sensor is actuated by the movement of the wedge.

* * * * *